US012682319B2

(12) United States Patent
Iyengar et al.

(10) Patent No.: US 12,682,319 B2
(45) Date of Patent: Jul. 14, 2026

(54) ARTIFICIALLY INTELLIGENT PERCEPTIVE ENTERTAINMENT COMPANION SYSTEM

(71) Applicant: RN CHIDAKASHI TECHNOLOGIES PRIVATE LIMITED, Mumbai (IN)

(72) Inventors: Prashant Iyengar, Mumbai (IN); Hardik Godara, Jodhpur (IN)

(73) Assignee: RN CHIDAKASHI TECHNOLOGIES PRIVATE LIMITED, Mumbai (IN)

( * ) Notice: Subject to any disclaimer, the term of this patent is extended or adjusted under 35 U.S.C. 154(b) by 0 days.

(21) Appl. No.: 18/282,537

(22) PCT Filed: Mar. 24, 2022

(86) PCT No.: PCT/IN2022/050293
§ 371 (c)(1),
(2) Date: Sep. 17, 2023

(87) PCT Pub. No.: WO2022/201198
PCT Pub. Date: Sep. 29, 2022

(65) Prior Publication Data
US 2024/0181629 A1 Jun. 6, 2024

(51) Int. Cl.
*B25J 9/00* (2006.01)
*G05B 13/02* (2006.01)
(Continued)

(52) U.S. Cl.
CPC .......... *B25J 9/0003* (2013.01); *G05B 13/028* (2013.01); *G06V 10/764* (2022.01); *G06V 40/20* (2022.01)

(58) Field of Classification Search
CPC ........... G06N 3/008; G06N 5/02; G06N 5/04; G06N 20/00; G06N 3/049; G06N 3/0464; G06N 3/063; G06N 3/08; G06N 3/088; B25J 11/001; B25J 11/0015; B25J 9/1694; B25J 11/0005; B25J 13/08; B25J 11/008; B25J 11/009; B25J 13/006; B25J 5/007;
(Continued)

(56) References Cited

U.S. PATENT DOCUMENTS

2019/0366558 A1* 12/2019 Gupta ................... B25J 11/009
2021/0097893 A1* 4/2021 Klappert ............. G06F 16/9024
(Continued)

*Primary Examiner* — Alex Kok S Liew

(57) ABSTRACT

The embodiments herein relate to an artificially intelligent perceptive entertainment companion system (100) including a memory and a processor, provides companionship to a user (102) during at least one of an entertainment event or an entertainment activity. The processor is configured to capture a performance performed by the user (102) using a camera (108), determine one or more reactions of the user (102) in the captured performance using a reaction analyser, transmit the captured performance and the determined one or more reactions to a server (106) using a wireless transmitter, receive and process a perception of the user (102) from the server (106) to determine one or more activities, and initiate the one or more activities to the user (102) using one or more robot actuators based on the perception of the user (102) that provides companionship to the user (102) even when human companions are not available.

11 Claims, 10 Drawing Sheets

(51) Int. Cl.
   *G06V 10/764*         (2022.01)
   *G06V 40/20*          (2022.01)

(58) Field of Classification Search
   CPC ........ B25J 9/0009; B25J 9/163; B25J 9/1669;
          B25J 9/0003; G06V 40/103; G06V 20/10;
            G06V 40/161; G06V 40/172; G06V
              40/176; G06V 10/764; G06V 40/16;
            G06V 40/174; G06V 40/20; G06V 40/25
   See application file for complete search history.

(56)               References Cited

U.S. PATENT DOCUMENTS

2022/0093000 A1*   3/2022   Munich ............. G06F 16/90332
2022/0215691 A1*   7/2022   Kose Cihangir .. G08B 21/0469

* cited by examiner

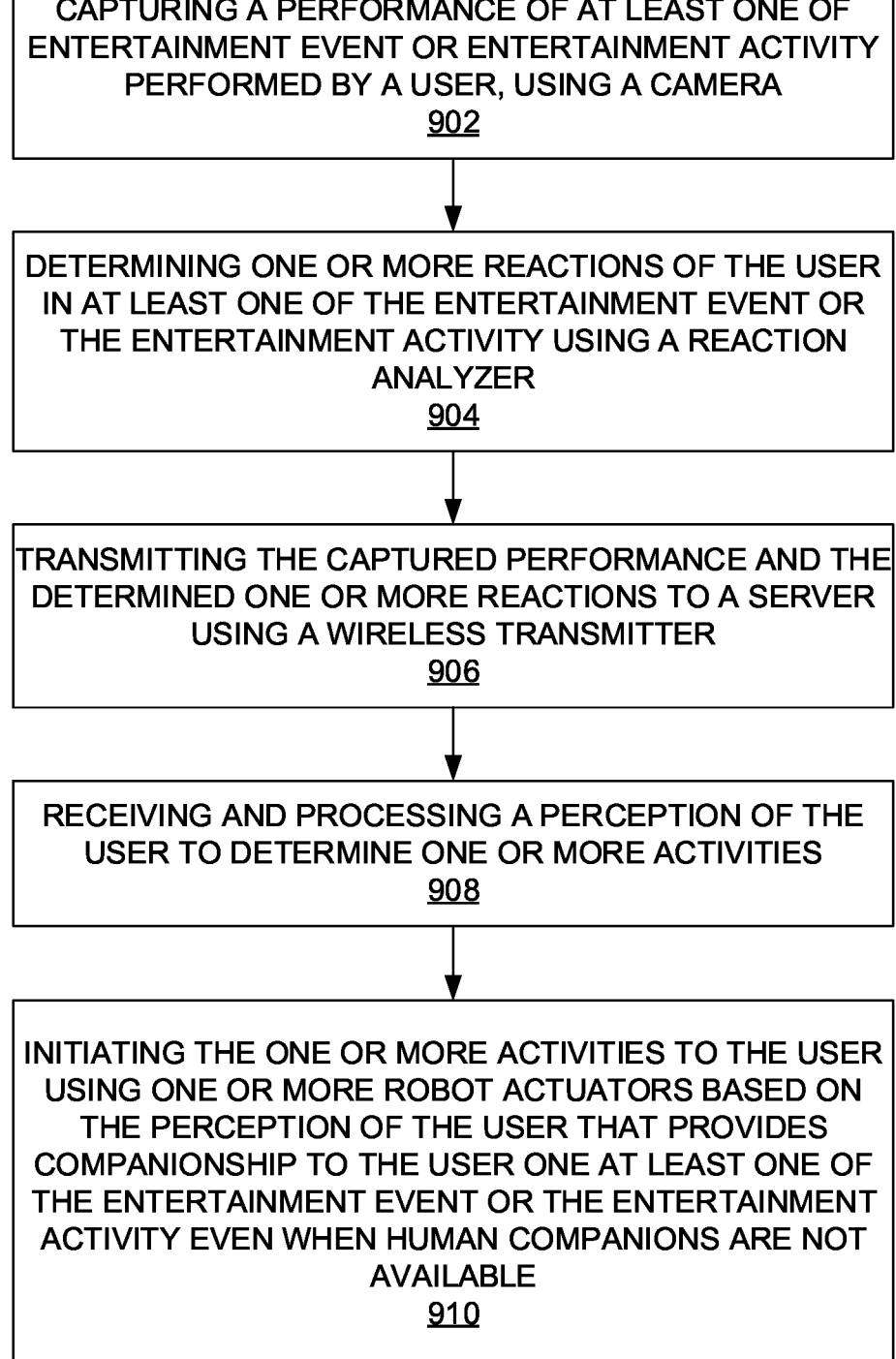

CAPTURING A PERFORMANCE OF AT LEAST ONE OF ENTERTAINMENT EVENT OR ENTERTAINMENT ACTIVITY PERFORMED BY A USER, USING A CAMERA
902

DETERMINING ONE OR MORE REACTIONS OF THE USER IN AT LEAST ONE OF THE ENTERTAINMENT EVENT OR THE ENTERTAINMENT ACTIVITY USING A REACTION ANALYZER
904

TRANSMITTING THE CAPTURED PERFORMANCE AND THE DETERMINED ONE OR MORE REACTIONS TO A SERVER USING A WIRELESS TRANSMITTER
906

RECEIVING AND PROCESSING A PERCEPTION OF THE USER TO DETERMINE ONE OR MORE ACTIVITIES
908

INITIATING THE ONE OR MORE ACTIVITIES TO THE USER USING ONE OR MORE ROBOT ACTUATORS BASED ON THE PERCEPTION OF THE USER THAT PROVIDES COMPANIONSHIP TO THE USER ONE AT LEAST ONE OF THE ENTERTAINMENT EVENT OR THE ENTERTAINMENT ACTIVITY EVEN WHEN HUMAN COMPANIONS ARE NOT AVAILABLE
910

FIG. 9

ARTIFICIALLY INTELLIGENT PERCEPTIVE ENTERTAINMENT COMPANION SYSTEM

BACKGROUND

Technical Field

The embodiments herein generally relate to artificial intelligence and robotics, more particularly to an Artificially Intelligent (AI) perceptive entertainment device for providing companionship to a human being or group of human beings for physical and/or digital entertainment related activities and events.

Description of the Related Art

With developments in Artificial Intelligence (AI), machines and devices, including robots are capable of performing human like roles, including processing voice inputs, engaging in conversation, and processing sensory inputs to determine emotions of human beings. Such artificially intelligent devices have applications spanning not only performing routine activities, but also in education. When emotional intelligence is added to artificial intelligence, such devices are capable of providing companionship to human beings.

At times when there are restrictions in travelling, interacting with other human beings, and attending any entertainment events becomes a challenge. Although entertainment events like watching movies, playing video games, and watching live concerts are available to users within the comfort of their homes, they do not compare to the excitement of experiencing live entertainment events along with friends who share a common interest in the entertainment events or activities.

Accordingly, there remains a need for using technology and devices to enable human beings to experience entertainment events and activities along with companionship, even when human companions are unavailable or inaccessible and experience live entertainment events with help of perceptive entertainment companion devices.

SUMMARY

An embodiment herein provides an artificially intelligent perceptive entertainment companion system that provides companionship to a user during at least one of an entertainment event or an entertainment activity. The artificially intelligent perceptive entertainment companion system includes a memory that stores instructions and a processor that executes the instructions. The processor is configured to capture a performance of the at least one of the entertainment event or the entertainment activity performed by the user using a camera, determine one or more reactions of the user in the captured performance using a reaction analyzer, transmit the captured performance and the determined one or more reactions to a server using a wireless transmitter, receive and process the perception of the user from the server to determine one or more activities, initiate the one or more activities to the user using one or more robot actuators, based on the perception of the user that provides companionship to the user on the at least one of the entertainment event or the entertainment activity even when human companions are not available.

In some embodiments, the perception of the user is determined in the server by initiating a machine learning algorithm that processes the captured performance of the at least one of the entertainment event or the entertainment activity performed by the user, and the one or more reactions of the user.

In some embodiments, the performance includes any of singing, dancing, or playing musical instrument by the user. The server analyses a user viewing experience with at least one of the entertainment event or the entertainment activity to determine the perception of the user.

In some embodiments, the one or more activities comprises any of walking, talking, cheering, or making conversations about the at least one entertainment event or the entertainment activity.

In some embodiments, the processor is configured to store audio/video feeds of the at least one entertainment event or entertainment activity in a knowledge database.

In some embodiments, the processor is configured to observe a viewing pattern of the user along with sentiment and behavior exhibited by the user, and classify the sentiment exhibited by the user. The classification includes any of a positive reaction or a negative reaction. The processor is configured to save the positive reaction and the negative reaction in the knowledge database.

In some embodiments, the processor is configured to measure grades of the user based on user's measure of liking any of actors, musicians, movies, TV shows, web series, musical programs, live entertainment events, and activities on online or at physical locations including a play at a theatre, or a musical concert. The grades are calculated based on contents viewed, users time spent on the activity, and sentiments expressed during at least one of the entertainment event or the entertainment activity. The processor is configured to generate the one or more activities with varying sentiments in different durations, based on the grades of the user.

In some embodiments, the processor is configured to acquire information about at least one of the entertainment event or the entertainment activity from the user, determine conversations about the at least one entertainment event or the entertainment activity, interact the conversations with the user and acquire information on user preferences, and enable one or more robot actuators for communicating the conversations to the user through the one or more expressions, wherein the one or more robot actuators enables the artificially intelligent perceptive entertainment companion system to perform any of a sound output, a movement or an illumination.

In an aspect, a method for accompanying a user during at least one of an entertainment event or an entertainment activity with an artificially intelligent perceptive entertainment companion system is provided. The method includes (i) capturing a performance of the at least one of the entertainment event or the entertainment activity performed by the user using a camera, (ii) determining one or more reactions of the user in at least one of the entertainment event or the entertainment activity using a reaction analyser, (iii) transmitting the captured performance and the determined one or more reactions to a server using a wireless transmitter, (iv) receiving and processing perception of the user to determine the one or more activities, and (v) initiating the one or more activities to the user using one or more robot actuators based on the perception of the user that provides companionship to the user on the at least one of the entertainment event or the entertainment activity even when human companions are not available.

The artificially intelligent perceptive entertainment companion system is a portable/body-held digital device or an anthropomorphic device. The artificially intelligent perceptive entertainment companion system acquires information about the at least one entertainment event or the entertainment activity from a user's point of view and aggregates all information to determine conversations, which enables the artificially intelligent perceptive entertainment companion system to accompany the user emotionally.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 9 illustrates a flow diagram of a method of an artificially intelligent perceptive entertainment companion system during one or more entertainment events according to some embodiments herein.

DETAILED DESCRIPTION OF PREFERRED EMBODIMENTS

Figure 1:
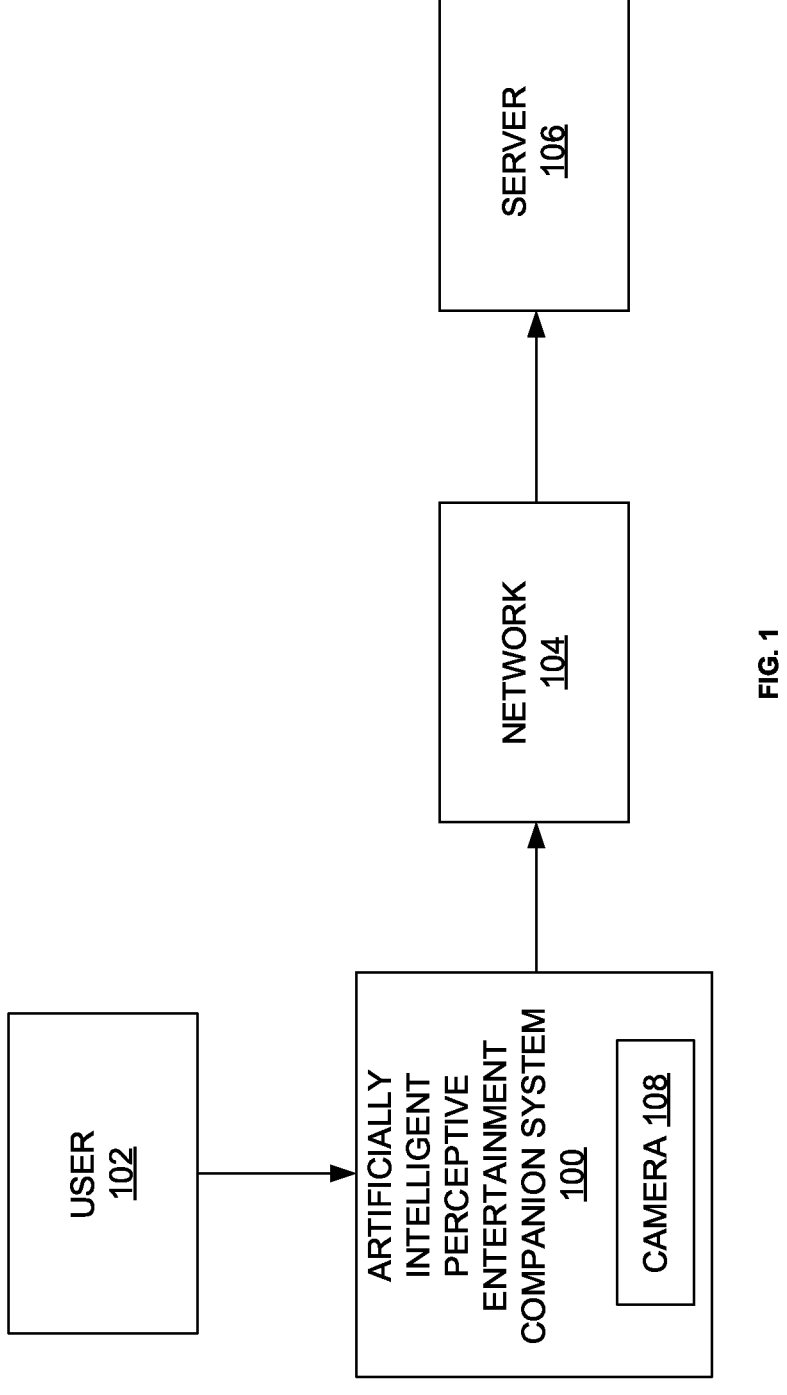
FIG. 1 illustrates a system view of an artificially intelligent perceptive entertainment companion system that obtains one or more reactions of a user and initiates one or more activities based on perception prediction according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for using technology and devices to enable human beings to experience entertainment events and activities along with companionship, even when human companions are unavailable or inaccessible and experience live entertainment events with help of perceptive entertainment companion device. Referring now to the drawings, and more particularly to FIGS. 1 through 10, where similar reference characters denote corresponding features consistently throughout the figures, preferred embodiments are shown.

FIG. 1 illustrates a system view of an artificially intelligent perceptive entertainment companion system 100 that obtains one or more reactions of a user 102 and initiates one or more activities based on perception prediction according to some embodiments herein. The artificially intelligent perceptive entertainment companion system 100 perceives one or more entertainment activities in a user perception to initiate the one or more activities. The system view includes the user 102, the artificially intelligent perceptive entertainment companion system 100, a network 104, and a server 106. In some embodiments, the artificially intelligent perceptive entertainment companion system 100 accompanies the user 102 during one or more entertainment activities. In some embodiments, the one or more entertainment activities may be at least one of an entertainment event or an entertainment activity performed by the user 102. The entertainment activity performed by the user 102 may be any of singing, dancing, playing a musical instrument and the like. In some embodiments, the artificially intelligent perceptive entertainment companion system 100 is configured to at least one of live entertainment events or live entertainment activities performed by the user 102.

The artificially intelligent perceptive entertainment companion system 100 captures a performance of at least one of the entertainment events or the entertainment activities performed by the user 102 using a camera 108. The artificially intelligent perceptive entertainment companion system 100 determines the one or more reactions of the user 102 in the captured performance. In some embodiments, the one or more reactions of the user 102 are determined by using a reaction analyser. The captured performance and the determined one or more reactions are transmitted to the server 106 through the network 104 using a wireless transmitter. In some embodiments, the wireless transmitter includes any of, but is not limited to a Wireless Fidelity (Wi-Fi), or a Bluetooth Communication. The server 106 may be an entertainment perception processing server that processes the one or more reactions of the user 102 and determines the one or more activities. In some embodiments, the server 106 includes a machine-learning algorithm to process the one or more reactions of the user 102 and to determine the perception of the user 102. The server 106 is configured to determine the perception of the user 102 by initiating the machine learning algorithm that processes the captured performance of the at least one of the entertainment event or the entertainment activity performed by the user 102, and the determined one or more reactions of the user 102. In some embodiments, the server 106 analyses a user viewing experience with at least one of the one or more captured entertainment activities, and determines the perception of the user 102. The artificially intelligent perceptive entertainment companion system 100 receives the determined perception of the user 102 from the server 106 and processes the perception of the user 102 to determine the one or more activities.

The artificially intelligent perceptive entertainment companion system 100 is configured to initiate the one or more activities to the user 102 based on the perception of the user 102 that provides companionship to the user on the at least one of the entertainment event or the entertainment activity even when the human companions are not available. The artificially intelligent perceptive entertainment companion system 100 initiates the one or more activities using one or more robot actuators. The artificially intelligent perceptive entertainment companion system 100 may be a wearable device, that can be worn by the user 102 or a handheld body. In some embodiments, the handheld body can be a robot system. In some embodiments, the artificially intelligent perceptive entertainment companion system 100 can be a portable digital device or an anthropomorphic device to provide one or more activities to the user 102. The artificially intelligent perceptive entertainment companion system 100 may include one or more hardware modules and interfaces integrated with the server 106 to predict the perception of the user 102.

In some embodiments, the artificially intelligent perceptive entertainment companion system 100 includes a memory to store instructions, and a processor to execute the instructions which initiates one or more activities based on a perception prediction of the user 102.

Figure 2:
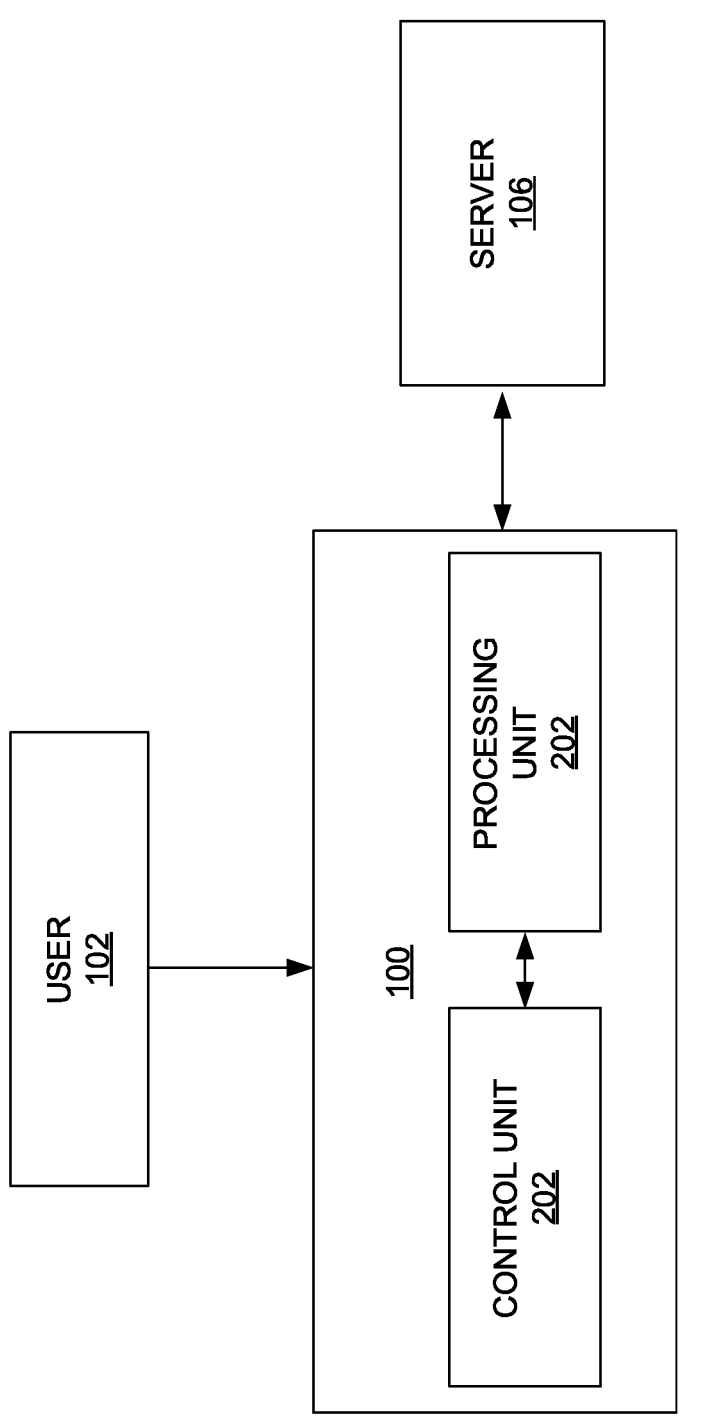
FIG. 2 illustrates a block diagram of the artificially intelligent perceptive entertainment companion system that perform one or more activities based on a perception of the user according to some embodiments herein.

FIG. 2 illustrates a block diagram of the artificially intelligent perceptive entertainment companion system 100 that performs the one or more activities based on the perception of the user 102 according to some embodiments herein. The artificially intelligent perceptive entertainment companion system 100 includes a control unit 202 and a processing unit 204. The artificially intelligent perceptive entertainment companion system 100 communicates with the server 106. The server 106 may include one or more audio visual feeds of the one or more entertainment activities or events. The server 106 is configured to determine the perception of the user. In some embodiments, the server 106 determines the perception of the user 102 for at least one of the entertainment activity or the entertainment event. The server 106 may determine the perception of the user 102 by running the machine learning algorithm on the captured performance of the at least one of the entertainment event or the entertainment activity. In some embodiments, the server 106 determines the perception of the user 102 by running the machine learning algorithm on the one or more reactions of the user 102.

The artificially intelligent perceptive entertainment companion system 100 receives the perception of the user 102 from the server 102. The processing unit 204 processes the perception of the user 102 and enables the artificially intelligent perceptive entertainment companion system 100 to initiate the one or more activities. The processing unit 202 controls the the artificially intelligent perceptive entertainment companion system 100 based on the one or more activities. The one or more activities may be any of walking, talking, cheering, making conversations about the entertainment event or activity and the like.

In some embodiments, the artificially intelligent perceptive entertainment companion system 100 includes obtaining semantic information from the user 102 and audio/video feeds relevant to the at least one entertainment event or activity, that is being viewed by the user 102. The artificially intelligent perceptive entertainment companion system 100 may include an event information knowledge database that stores the audio/video feeds relevant to the one or more entertainment events and activities. The semantic information from the user 102 and the audio/video feeds relevant to the at least one entertainment event or activity may be an input to the control unit 202. In some embodiments, the control unit 202 acquires information about the at least one of the entertainment event or the entertainment activity from a point of view of the user 102. The control unit 202 is configured to aggregate all information to determine conversations about the at least one of the entertainment activity or the entertainment event. In some embodiments, the control unit 202 determines the conversations about the at least one entertainment activity or event that can be any of an online event or activity, or a physical event or activity scheduled at physical locations.

Figure 3:
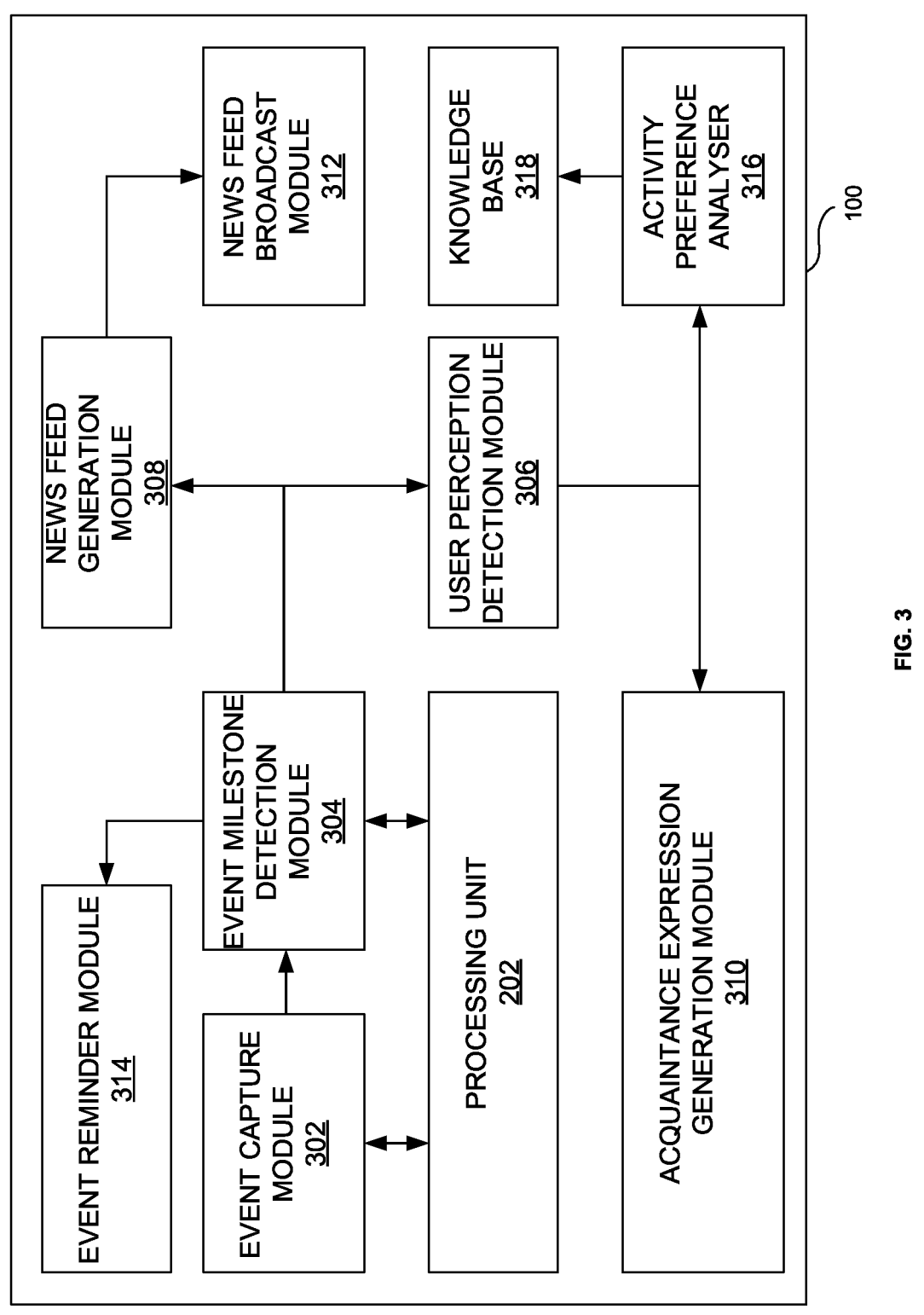
FIG. 3 illustrates a block diagram of the artificially intelligent perceptive entertainment companion system according to some embodiments herein.

FIG. 3 illustrates a block diagram of the artificially intelligent perceptive entertainment companion system 100 according to some embodiments herein. The artificially intelligent perceptive entertainment companion system 100 includes an event capture module 302, the processing unit 202, an event milestone detection module 304, a user perception detection module 306, a news feed generation module 308, an acquaintance expression generation module 310, a news feed broadcast module 312, an event reminder module 314, an activity preference analyzer 316 and a knowledge database 318. The artificially intelligent perceptive entertainment companion system 100 interacts with the user 102 and acquires information from the user 102 about at least one of the entertainment event or the entertainment activity. The information may be any of, but not limited to, favourite artists, actors, musicians, movies, TV shows, web series, musical programs, live entertainment events that can be either an online event or physical locations like a play at a theatre, a musical concert and the like. The event capture module 302 capture at least one of the entertainment event or activity, and the processing unit 202 enables the event milestone detection module 304 to detect milestones in the captured event. The milestones may be any of a starting or an ending of at least one of the entertainment event or the entertainment activity.

The processing unit 202 enables the user perception detection module 306 to determine the one or more reactions of the user 102 when the event milestone detection module 304 detects the milestones. In some embodiments, the artificially intelligent perceptive entertainment companion system 100 includes a reaction detection module to determine the one or more reactions of the user 102. The processing unit 202 is configured to generate the determined reaction in the artificially intelligent perceptive entertainment companion system 100 using the acquaintance expression generation module 310. In some embodiments, the reactions can be any of audio/video expression for cheer, audio/video expression for applause, illumination lights, audio/video expression for disappointment, or audio/video expression for anger. The processing unit 202 is configured to save the reactions of the user 102 in the knowledge database 318. In some embodiments, the artificially intelligent perceptive entertainment companion system 100 communicates with the user 102 when the milestones are detected that are relevant to the at least one of the entertainment event or activity. In some embodiments, the artificially intelligent perceptive entertainment companion system 100 communicates with the user 102 even when the event capture module 302 is on OFF condition. The artificially intelligent perceptive entertainment companion system 100 may communicate grand finale of a TV show, Team winning or losing a musical event, episode highlights, movie reviews, and the like. The artificially intelligent perceptive entertainment companion system 100 may include one or more modes. The one or more modes may be a news mode, a capture mode, a passive mode, a companion mode, an aggregator mode, a memory mode, a recapitulation mode, and a calendar mode.

In some embodiments, the artificially intelligent perceptive entertainment companion system 100 functions in the news mode to relay daily news updates relating to at least one entertainment event or activity based on the user preferences. The user preference may be determined from the semantic information from the user 102. In some embodiments, the artificially intelligent perceptive entertainment companion system 100 can relay past news feeds in the news mode related to at least one of event or activity based on the user preferences. In some embodiments, the processing unit 202 enables the news feed generation module 308 to generate the news feed from one or more news sources when the artificially intelligent perceptive entertainment companion system 100 acquires the news mode. The news feed may be from the knowledge database 318 or the one or more news sources. In some embodiments, the news feed can be from any of the semantic information of the user 102, or the entertainment event or activity, audiovisual input. The processing unit 202 enables the news feed broadcast module 312 to broadcast the news feed to the user 102. In some embodiments, the broadcast can be any of video news feeds, audio news feeds or text news feeds.

The artificially intelligent perceptive entertainment companion system 100 observes a viewing pattern of the at least one entertainment activity or event of the user 102 along with a sentiment and behaviour exhibited by the user 102 during the entertainment activity or event. The user perception detection module 306 is configured to detect the perception of the user 102 and correlates the behaviour and sentiments exhibited by the user 102. In some embodiments, the user perception detection module 306 classifies the behaviour and sentiments of the user 102 in positive reaction and negative reaction. The positive reaction and the negative reaction may be stored in the knowledge database 318. The activity preference analyzer 316 uses the determined reaction as inputs to predict the user preferences. The predicted user preferences may be saved in the knowledge database 318.

In some embodiments, the artificially intelligent perceptive entertainment companion system 100 obtains the information about the entertainment event or activity by using one or more sensors. The one or more sensors may include audiovisual sensors. In some embodiments, the artificially intelligent perceptive entertainment companion system 100 interacts with the user 102 through an output module and acquires information from the user 102 on the user preferences. The acquired information from the user 102 may be stored in the knowledge database 108. The output module may be any of audio output or video output. In some embodiments, the output module can communicate through one or more expressions in the artificially intelligent perceptive entertainment companion system 100. The one or more expressions may include any of a robot actuator which includes sound, a movement, or an illumination but is not limited by the same. In some embodiments, the output module activates robot actuators when important milestones that are relevant to the entertainment event or activity, the user 102 has expressed interest in has occurred. In some embodiments, the output module communicates the one or more expressions even if the artificially intelligent perceptive entertainment companion system 100 is on OFF condition.

The artificially intelligent perceptive entertainment companion system 100 may include an artificial intelligence platform to perform collaborative activities of the user 102 with an actual object or a virtual embodiment. The actual object may be a portal robot that is capable of locomotion. In some embodiments, the artificially intelligent perceptive entertainment companion system 100 includes facial arrangement including a screen and an auditory system that is enabled by an array of microphones. In some embodiments, the artificially intelligent perceptive entertainment companion system 100 can be in a form of a portable robot. The portable robot may be any of a drone, a smartwatch, a head camera, or an i-smart glass, that accompanies the user 102 in the at least one entertainment event or activity.

In some embodiments, the artificially intelligent perceptive entertainment companion system 100 detects the user 102 and reminds the user 102 about user-preferred event schedule. The event schedule may be at least one of the entertainment event or activity. The artificially intelligent perceptive entertainment companion system 100 may remind the user 102 with a reminder through the event reminder module 314. The reminder may be any of an audio reminder, a text reminder or a video reminder. In some embodiments, the artificially intelligent perceptive entertainment companion system 100 activates the calendar mode to provide an alert to the user 102 about the entertainment event or activity schedule based on the user preferences.

In some embodiments, the artificially intelligent perceptive entertainment companion system 100 builds a framework on the user preferred entertainment activities or events. The artificially intelligent perceptive entertainment companion system 100 may include preferential list of activities that can be accessed by a user device through a network. In some embodiments, the user device provides at least one of the entertainment activity or event suggestions correlated to the user perception.

Figure 4:
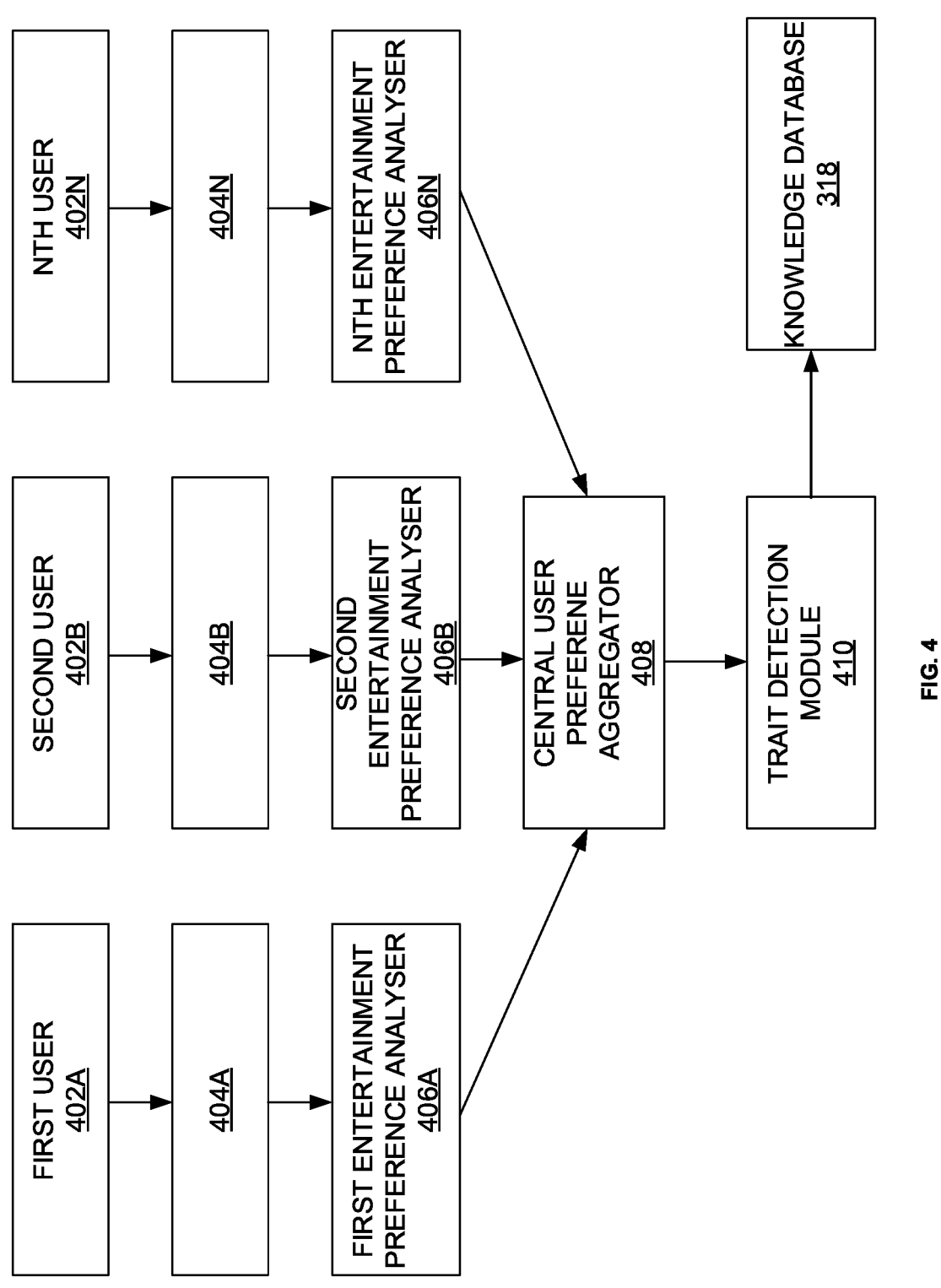
FIG. 4 illustrates a system view of one or more artificially intelligent perceptive entertainment companion systems in an aggregator mode according to some embodiments herein.

FIG. 4 illustrates a system view of the one or more artificially intelligent perceptive entertainment companion systems 404A-N in an aggregator mode according to some embodiments herein. The system view includes one or more users 402A-N, the artificially intelligent perceptive entertainment companion systems 404A-N, one or more entertainment preference analysers 406A-N, a central user preference aggregator 408, a trait detection module 410, and the knowledge database 318. The preference information can be collected from the one or more users 402A-N with the one or more entertainment preference analysers 404A-N, associated with the artificially intelligent perceptive entertainment companion system 100.

The central user preference aggregator 408 receives one or more preferences from the one or more entertainment preference analysers 404A-N. The central user preference aggregator 408 enables the trait detection module 410 to classify the one or more users 402A-N into one or more groups based on factors like any of location, gender, age, ethnicity, nationality, behaviour and the like, that enables group behaviour and predict behaviour traits common to at least one group. In some embodiments, the behaviour traits enable a companion mode in the artificially intelligent perceptive entertainment companion system 100 to engage more with the user 102. The artificially intelligent perceptive entertainment companion system 100 may also classify group traits based on at least one of, but not limited to episodes watched, number of times watched, number of physically attended events, and duration and time of watch. In some embodiments, one or more group separations can be based on at least one of the traits, or preferences. The traits may include any of group traits, behaviour traits or seasonal traits. The preferences may include any of the user preferences or seasonal preferences. The one or more group separations may be stored in the knowledge base 318.

The artificially intelligent perceptive entertainment companion system 100 may use the predicted behaviour traits to get acquainted with a new user of the artificially intelligent perceptive entertainment companion system 100. In some embodiments, the artificially intelligent perceptive entertainment companion system 100 converses interactively with the user 102. When the user 102 asks queries related to at least one entertainment event or activity, the artificially intelligent perceptive entertainment companion system 100 takes the user preferences of the user 102 and seasonal entertainment preferences into consideration and continues the conversation with the user 102 based on the user preferences. The artificially intelligent perceptive entertainment companion system 100 may include an incessant conversation module that initiates conversations with the user 102, considering the user preferences, the seasonal preferences, and the group traits.

The artificially intelligent perceptive entertainment companion system 100 may include a confidant-challenger mode. The artificially intelligent perceptive entertainment companion system 100 may exhibit sentiments conducive to the user 102 in the confidant-confidant mode and sentiments opposing the user 102 in the confidant-challenger mode for a specific entertainment event or as desired by the user 102.

The artificially intelligent perceptive entertainment companion system 100 may include a sort mode to measure grades of the user 102 based on users measure of liking any of the actors, musicians, movies, TV shows, web series, musical programs, live entertainment events and activities on online or at physical locations like a play at the theatre, a musical concert and the like, are calculated based on contents viewed, users time spent on the entertainment activity, and sentiments expressed. In some embodiments, different grades can be assigned based on the user's measure of liking. Based on the grades, the activities are sorted and the artificially intelligent perceptive entertainment companion system 100 expresses varying sentiments in different durations to different activities preferred by the user 102.

Figure 5:
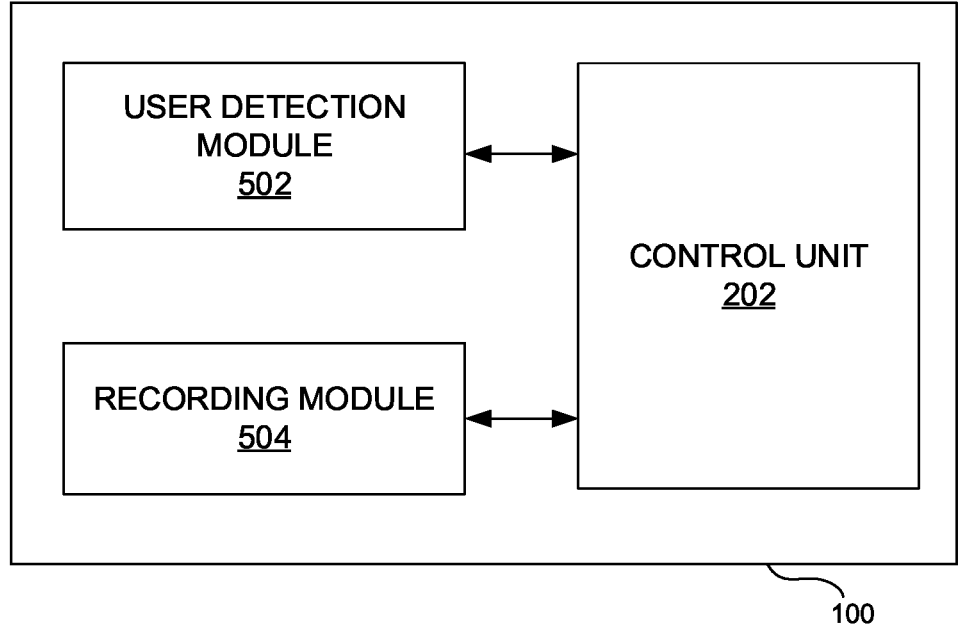
FIG. 5 illustrates a block diagram of the artificially intelligent perceptive entertainment companion system in a capture mode according to some embodiments herein.

FIG. 5 illustrates a block diagram of the artificially intelligent perceptive entertainment companion system 100 in a capture mode according to some embodiments herein. The artificially intelligent perceptive entertainment companion system 100 enables the capture mode when the user 102 is not available to view the entertainment event using audio visual capabilities. The artificially intelligent perceptive entertainment companion system 100 includes a user detection module 502, a recording module 504, and the control unit 202. The user detection module 502 detects whether the user 102 is available to view the event. In some embodiments, the user detection module 502 can determine the user 102 is present or not. If the user 102 is not available, the user detection module 502 enables the recording module 504 of the artificially intelligent perceptive entertainment companion system 100 to record the entertainment event. The recording module 504 may include a camera to record the entertainment event. In some embodiments, the recorded event can be scheduled to play when the user 102 is present. If the user 102 is available, the control unit 202 switches on the smart viewing device to view the entertainment event.

In some embodiments, the artificially intelligent perceptive entertainment companion system 100 can be integrated into a smart viewing device of the user 102, and the artificially intelligent perceptive entertainment companion system 100 switches on the smart viewing device when the entertainment event preferred by the user 102 is scheduled, when the smart viewing device is on OFF condition. In some embodiments, the smart viewing device can be a smart television system. The artificially intelligent perceptive entertainment companion system 100 may handle a physical control unit of the smart viewing device and switch on and control the smart viewing device when the entertainment event preferred by the user 102 is scheduled. In some embodiments, the artificially intelligent perceptive entertainment companion system 100 can be integrated with a handheld device and includes touch-based activation and visual feedback to navigate to an interactive application broadcasting the event. In some embodiments, the handheld device can be any of a mobile phone or a laptop. The artificially intelligent perceptive entertainment companion system 100 may include a copy mode that records the entertainment event using one or more storage features on the smart viewing device if the user 102 is not available to view the event.

Figure 6:
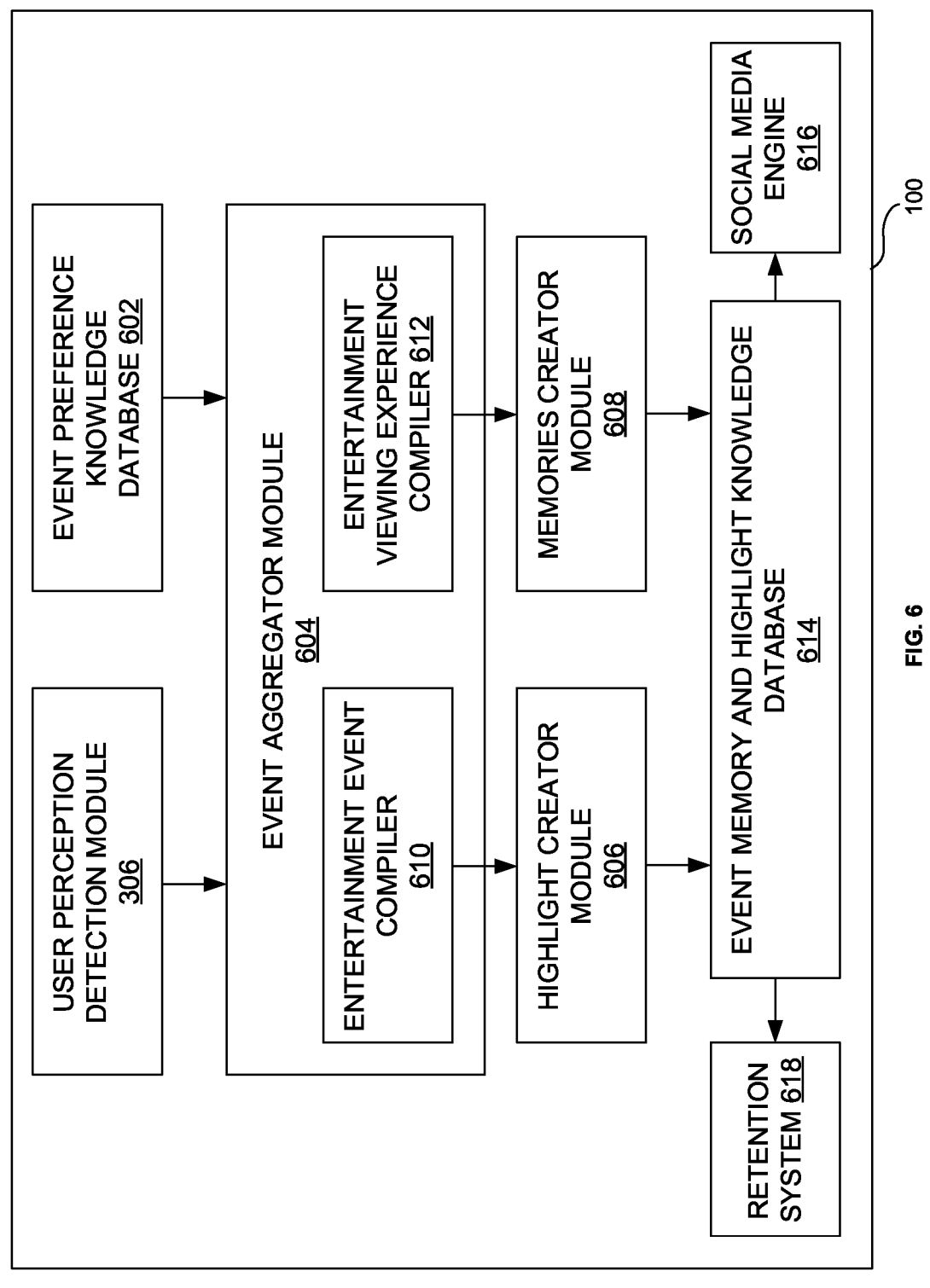
FIG. 6 illustrates a block diagram of the artificially intelligent perceptive entertainment companion system according to some embodiments herein.

FIG. 6 illustrates a block diagram of the artificially intelligent perceptive entertainment companion system 100 according to some embodiments herein. The artificially intelligent perceptive entertainment companion system 100 includes the user perception detection module 306, an event preference knowledge database 602, an event aggregator module 604, a highlight creator module 606, a memories creator module 608, an event memory and highlight knowledge database 614, a social media engine 616, and a retention system 618. The event aggregator module 604 obtains the reactions of the user 102 from the user perception detection module 604 and the user preferences from the event preference knowledge database 602. The event aggregator module 604 includes an entertainment event compiler 610 and an entertainment viewing experience compiler 612. In some embodiments, the event aggregator module 604 includes a compiler for entertainment events and a compiler for entertainment viewing experience.

The artificially intelligent perceptive entertainment companion system 100 uses the entertainment event compiler 610 to compile visuals of the user preference of a particular entertainment event and create highlights of each individual entertainment event, when the artificially intelligent perceptive entertainment companion system 100 enables the recapitulation mode. The artificially intelligent perceptive entertainment companion system 100 enables the highlight creator module 606 to create the highlights of the entertainment event based on the user preferences and share them with the user 102. The artificially intelligent perceptive entertainment companion system 100 uses the entertainment viewing experience compiler 612 to compile visuals of user viewing experience and present the visuals in form of memories to the user 102 when the artificially intelligent perceptive entertainment companion system 100 enables the memory mode. The artificially intelligent perceptive entertainment companion system 100 enables the memories creator module 608 to create the visuals of the event based on the user viewing experience. In some embodiments, the artificially intelligent perceptive entertainment companion system 100 enable telepresence mode and activates remote motor capabilities to facilitate community event viewing experience. The artificially intelligent perceptive entertainment companion system 100 stores the highlights and the memories in the event memory and highlight knowledge database 614.

The artificially intelligent perceptive entertainment companion system 100 is integrated with the social media engine 616 that captures the reactions of the user 102 while viewing the entertainment event and sort out key visuals, summarizes with social media platform requirements and shares them in one or more platforms. In some embodiments, the social media engine 616 is configured to capture the reactions of the user 102 while viewing the event, sort out key visuals, and summarizes into at least one of image or text. In some embodiments, the reactions of the user 102 can be emotions of the user 102. The social media engine 616 may generate a post to share on the one or more platforms. The one or more platforms may include any of Whatsapp, Facebook, Twitter, Snapchat, and the like. In some embodiments, the social media engine 616 can be a tweet generator to generate tweets according to the reactions of the user 102. The social media engine 616 may receive the highlights and the memories from the event memory and highlight knowledge database 614. In some embodiments, the social media engine 616 enables the user 102 to review the generated post and share the post on the one or more platforms. The social media engine 616 may generate one or more versions of the post along with an image or a graphics interface file with variations that can be selected by the user 102.

In some embodiments, the retention system 618 includes a memory retention system and a local memory retention system. The retention system 618 may be a storage to store the created memories and the highlights of the event. In some embodiments, the retention system 618 accesses the event memory and highlight knowledge database 614.

The storage of the retention system 618 may be based on a user subscription. The storage may be in a range of 10 GB to 1 TB but is not limited by the same. In some embodiments, the memories can get shorter if the user 102 has not renewed the user subscription. The retention system 618 may keep key memories and erase other memories based on the user preferences. In some embodiments, the duration of the memory is correlated to the pricing plan of the artificially intelligent perceptive entertainment companion system 100. In some embodiments, the retention system 618 fades one or more memories that are not accessed by the user 102 based on the user preferences.

The artificially intelligent perceptive entertainment companion system 100 may capture the feeds if the user 102 is playing the sport and store in the retention system 618. In some embodiments, the artificially intelligent perceptive entertainment companion system 100 enables the user 102 to replay the feeds to review his/her performance. In some embodiments, the user 102 can purchase memories of other artificially intelligent perceptive entertainment companion systems at the entertainment events.

In some embodiments, the one or more modes include a dream-nightmare mode that is activated when there are no entertainment activities or events scheduled in near future. The artificially intelligent perceptive entertainment companion system 100 may generate videos related to the entertainment activities or events based on the user preferences, in the dream mode. The artificially intelligent perceptive entertainment companion system 100 may generate videos related to the entertainment activities or events that are not related to the user preferences, in the nightmare mode. In some embodiments, the artificially intelligent perceptive entertainment companion system 100 generates auto visual content related to the at least one of the entertainment activity or event liked by the user 102, that is categorized by one or more entertainment event properties. The one or more entertainment event properties may include at least one of, but not limited to, genre, artist, cast, release date, and the like.

The artificially intelligent perceptive entertainment companion system 100 may work in a virtual audience mode where the entertainment event may be viewed by only the one or more modules and relays of the artificially intelligent perceptive entertainment companion system 100 related to the entertainment event live to their human counterparts located remotely. In some embodiments, the user 102 can remotely control and navigate the artificially intelligent perceptive entertainment companion system 100 at the entertainment event. In some embodiments, the user 102 can navigate the artificially intelligent perceptive entertainment companion system 100 in the entertainment event and interact with humans or other artificially intelligent perceptive entertainment companion systems.

Figure 7:
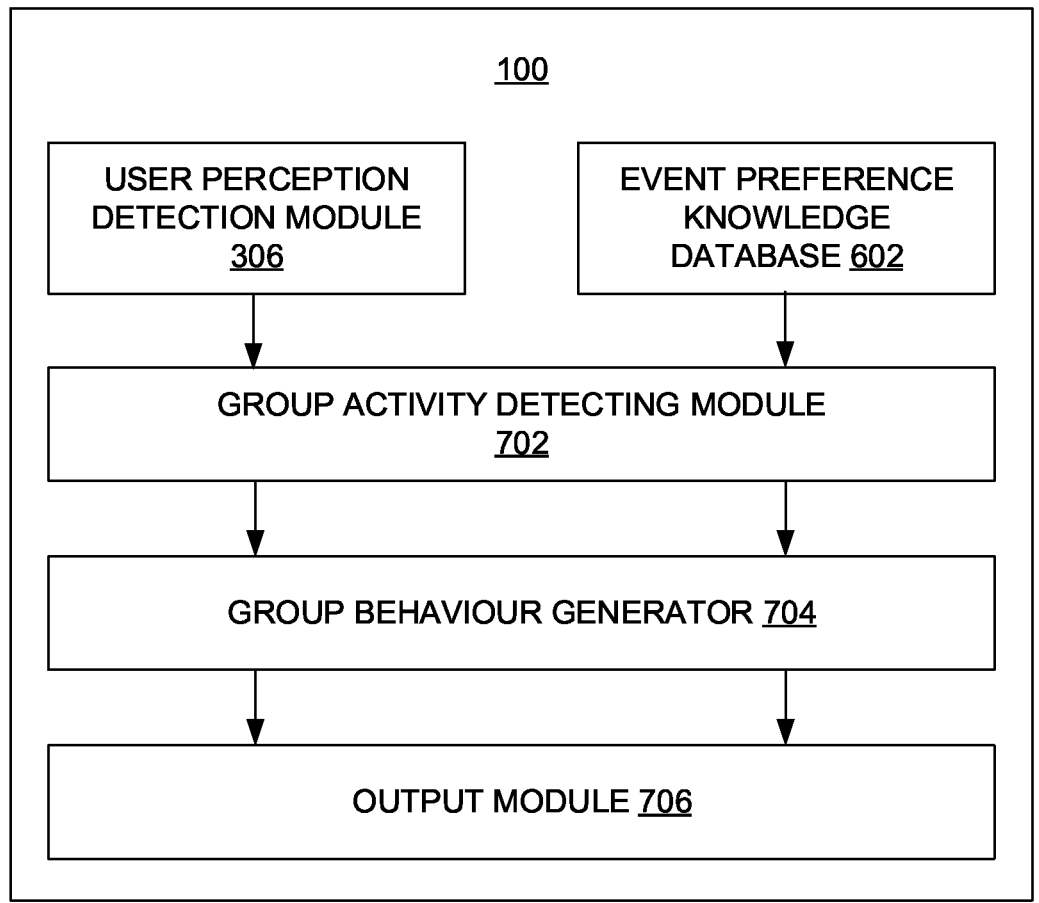
FIG. 7 illustrates a block diagram of the artificially intelligent perceptive entertainment companion system with a group activity detecting module according to some embodiments herein.

FIG. 7 illustrates a block diagram of the artificially intelligent perceptive entertainment companion system 100 with a group activity detecting module 702 according to some embodiments herein. The artificially intelligent perceptive entertainment companion system 100 includes the user perception detection module 306, the event preference knowledge database 602, the group activity detecting module 702, a group behaviour generator 704, and an output module 706. In some embodiments, the group activity detecting module 702 can be a crowd activity detecting module. In some embodiments, the group behaviour generator 704 can be a crowd behaviour generator. The user perception detection module 306 detects the reactions of the user 102, and near-by one or more users 402A-N based on the event preference knowledge database 502. The activity detecting module 602 detects at least one of cheer or applause from the reaction detection module 204 and the event preference knowledge database 602. Based on the at least one of cheer or applause detected on the group activity detecting module 702, the group behaviour generator 704 generates crowd behaviour output during the event. In some embodiments, the crowd behaviour output can be any of chant, laughter, fear, applause, cheer, or disappointment.

In some embodiments, the artificially intelligent perceptive entertainment companion system 100 can be present at a physical venue of any of the entertainment activity or the event, and facilitate the user 102 to visualize the ambiance of the physical venue, when the user 102 is in a remote location that is away from the physical venue. In some embodiments, the artificially intelligent perceptive entertainment companion system 100 creates a memory for the event using an event summarization module.

Figure 8:
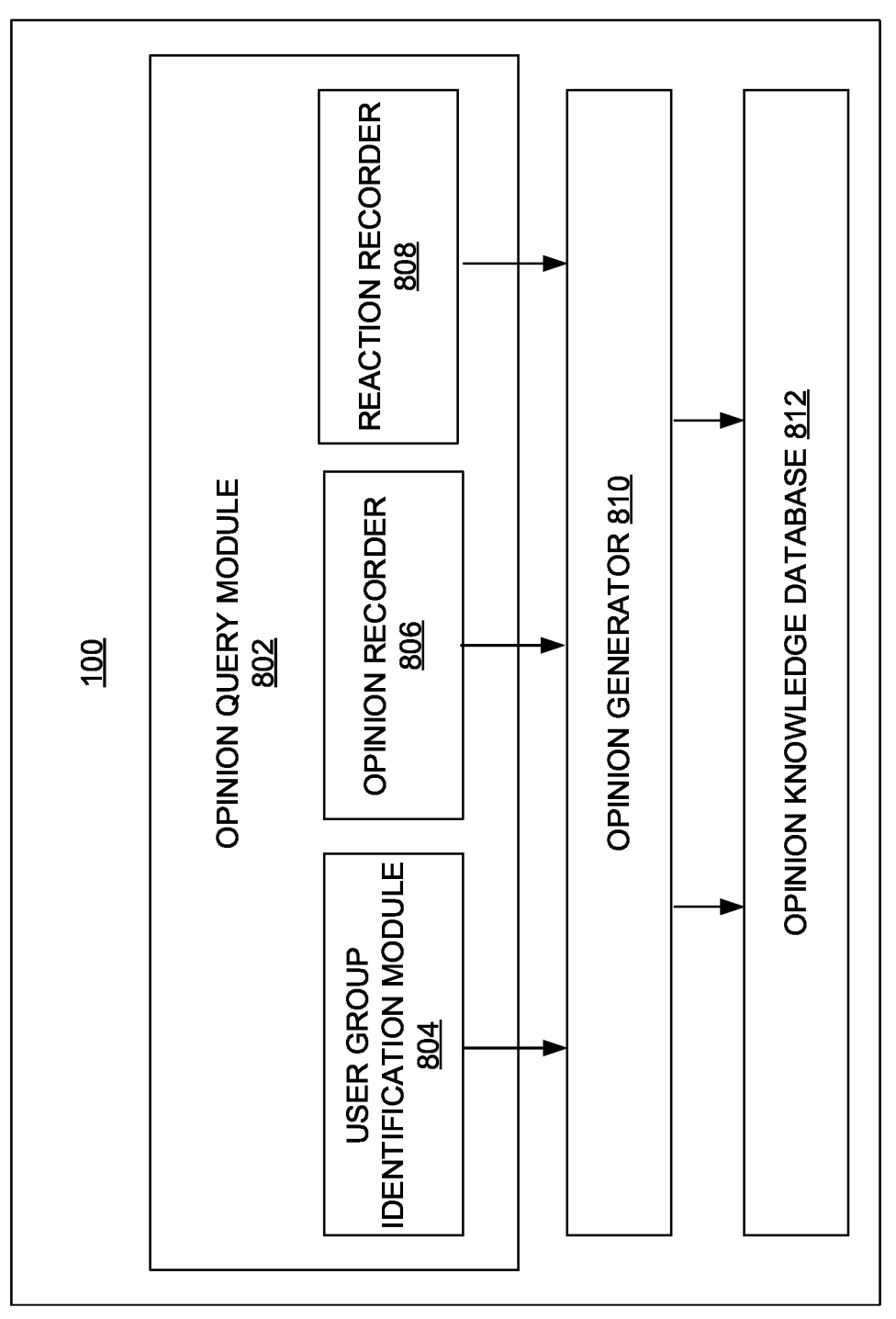
FIG. 8 is a block diagram of the artificially intelligent perceptive entertainment companion system for capturing user opinions according to some embodiments herein.

FIG. 8 is a block diagram of the artificially intelligent perceptive entertainment companion system 100 for capturing user opinions according to some embodiments herein. The artificially intelligent perceptive entertainment companion system 100 includes an opinion query module 802, an opinion generator 810, and an opinion knowledge database 812. The opinion query module 802 includes a user group identification module 804, an opinion recorder 806, and a reaction recorder 808. The user group identification 804 identifies the user group of the one or more users 402A-N based on the traits. The opinion recorder 806 is configured to capture one or more opinions of the user 102. In some embodiments, the one or more opinions include positive opinions or negative opinions of the user 102. The reaction recorder 808 records the reactions of the user 102 along with the one or more opinions.

The opinion generator 810 receives the user group, the one or more opinions of the user 102, and the reactions of the user 102 to generate the opinions. The opinion generator 810 exhibits opinions of the events to the user 102. In some embodiments, the opinions by the artificially intelligent perceptive entertainment companion system 100 can take either the positive opinion or the negative opinion based on the user preferences. The opinion knowledge database 812 stores the user group, the one or more opinions of the user 102, the reactions of the user 102, and the generated opinion. In some embodiments, the opinion generator 810 an act as a trainer to the user 102 with at least one of the positive opinion or the negative opinion.

FIG. 9 illustrates a flow diagram of a method for accompanying the user 102 during at least one of the entertainment event or the entertainment activity with the artificially intelligent perceptive entertainment companion system 100 according to some embodiments herein. At a step 902, the performance of the at least one of the entertainment event or the entertainment activity performed by the user 102 is captured using the camera 108. At a step 904, the one or more reactions of the user 102 in at least one of the entertainment event or the entertainment activity are determined using the reaction analyzer. At a step 906, the captured performance and the determined one or more reactions are transmitted to the server 106 using the wireless transmitter. At a step 908, the perception of the user is received and processed to determine the one or more activities. At a step 910, the one or more activities are initiated to the user using the one or more robot actuators based on the perspective of the user that provides companionship to the user on the at least one of the entertainment event or the entertainment activity even when the human companions are not available.

Figure 10:
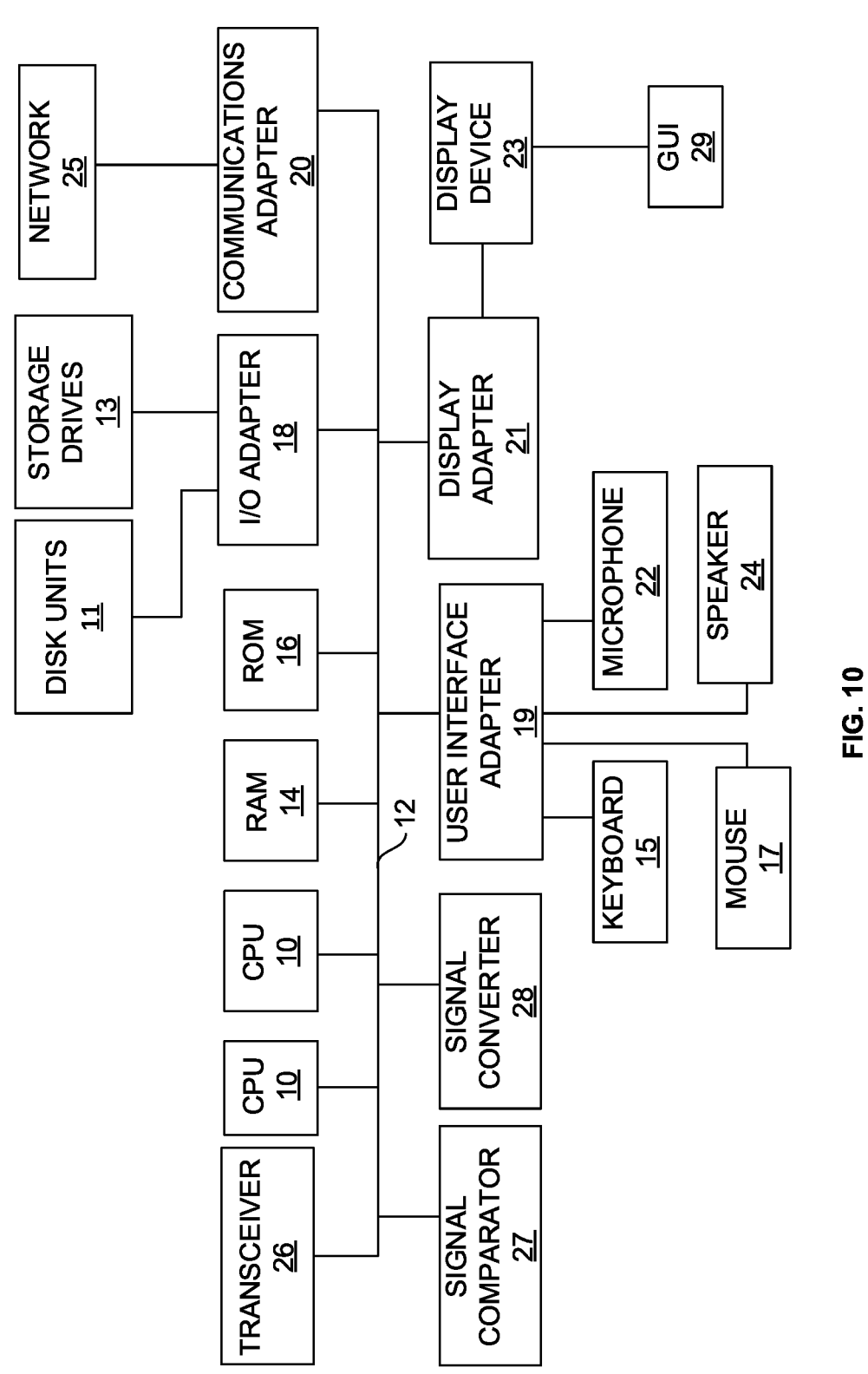
FIG. 10 is a schematic diagram of a computer architecture in accordance with the embodiments herein.

A representative hardware environment for practicing the embodiments herein is depicted in FIG. 10, with reference to FIGS. 1 through 9. This schematic drawing illustrates a hardware configuration of a server 116/computer system/computing device in accordance with the embodiments herein. The system includes at least one processing device CPU 10 and at least one graphical processing device GPU 38 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An artificially intelligent perceptive entertainment companion system that provides companionship to a user during at least one of an entertainment event or an entertainment activity, the artificially intelligent perceptive entertainment companion system comprising:
    a memory to store instructions; and
    a processor that executes the instructions, wherein the processor is configured to:
        capture, using a camera, a performance of the at least one of the entertainment event or the entertainment activity performed by the user, wherein the performance comprises at least one of singing, dancing, or playing a musical instrument by the user;
        determine, using a reaction analyzer, one or more reactions of the user in the captured performance;
        transmit the captured performance and the determined one or more reactions to a server, wherein the server analyzes a user viewing experience with the at least one entertainment event or the entertainment activity to determine perception of the user;
        characterized in that,
        receive and process the perception of the user to determine one or more activities;
        initiate, using one or more robot actuators, the one or more activities to the user based on the perception of the user that provides companionship to the user on at least one of the entertainment event or the entertainment activity even when human companions are not available.

2. The artificially intelligent perceptive entertainment companion system as claimed in claim 1, wherein the perception of the user is determined at the server by initiating a machine learning algorithm that processes the captured performance of the at least one of the entertainment event or the entertainment activity performed by the user, and the one or more reactions of the user.

3. The artificially intelligent perceptive entertainment companion system as claimed in claim 1, wherein the one or more activities comprises any of walking, talking, cheering, or making conversations about the at least one entertainment event or the entertainment activity.

4. The artificially intelligent perceptive entertainment companion system as claimed in claim 1, wherein the processor is configured to:
    store audio/video feeds of the at least one entertainment event or entertainment activity in a knowledge database.

5. The artificially intelligent perceptive entertainment companion system as claimed in claim 1, wherein the processor is configured to:
    observe a viewing pattern of the user along with sentiment and behavior exhibited by the user;
    classify the sentiment exhibited by the user, wherein the classification comprises any of a positive reaction or a negative reaction; and
    save the positive reaction and the negative reaction in the knowledge database.

6. The artificially intelligent perceptive entertainment companion system as claimed in claim 1, wherein the processor is configured to:

measure grades of the user based on user's measure of liking any of actors, musicians, movies, TV shows, web series, musical programs, live entertainment events and activities on online or at physical locations including a play at a theatre, or a musical concert, wherein the grades are calculated based on contents viewed, users time spent on the activity, and sentiments expressed during at least one of the entertainment event or the entertainment activity; and generate the one or more activities with varying sentiments in different durations, based on the grades of the user.

7. The artificially intelligent perceptive entertainment companion system as claimed in claim 1, wherein the processor is configured to:

acquire information about at least one of the entertainment event or the entertainment activity from the user;

determine perception of user about the at least one entertainment event or the entertainment activity;

interact with the user and acquire information on user preferences; and enable one or more robot actuators for communicating to the user through the one or more expressions, wherein the one or more robot actuators enables the artificially intelligent perceptive entertainment companion system to perform any of a sound output, a movement or an illumination.

8. A method for accompanying a user during at least one of an entertainment event or an entertainment activity with an artificially intelligent perceptive entertainment companion system, wherein the method comprises, capturing, using a camera, a performance of the at least one of the entertainment event or the entertainment activity, performed by the user, wherein the performance comprises at least one of singing, dancing, or playing a musical instrument by the user;

determining, using a reaction analyzer, one or more reactions of the user in at least one of the entertainment event or the entertainment activity;

transmitting the captured performance and the determined one or more reactions to a server, wherein the server analyzes a user viewing experience with the at least one entertainment event or the entertainment activity to determine perception of the user;

receiving and processing perception of the user to determine the one or more activities; and initiating, using one or more robot actuators, the one or more activities to the user based on the perception of the user that provides companionship to the user on the at least one of the entertainment event or the entertainment activity even when human companions are not available.

9. An artificially intelligent perceptive entertainment companion system that provides companionship to a user during at least one of an entertainment event or an entertainment activity, the artificially intelligent perceptive entertainment companion system comprising:

a memory to store instructions; and a processor that executes the instructions, wherein the processor is configured to:

capture, using a camera, a performance of the at least one of the entertainment event or the entertainment activity performed by the user, wherein the performance comprises at least one of singing, dancing, or playing a musical instrument by the user;

determine, using a reaction analyzer, one or more reactions of the user in the captured performance by (i) observing a viewing pattern of the user along with sentiment and behavior exhibited by the user, (ii) classifying the sentiment exhibited by the user as any of a positive reaction or a negative reaction, and (iii) storing the positive reaction and the negative reaction in a knowledge base;

receive and process perception of the user to determine one or more activities of the user; and initiate, using one or more robot actuators, the one or more activities to the user based on the perception of the user that provides companionship to the user on at least one of the entertainment event or the entertainment activity even when human companions are not available.

10. The artificially intelligent perceptive entertainment companion system as claimed in claim 9, wherein the processor is configured to:

measure grades of the user based on user's measure of liking any of actors, musicians, movies, TV shows, web series, musical programs, live entertainment events and activities on online or at physical locations including a play at a theatre, or a musical concert, wherein the grades are calculated based on contents viewed, users time spent on the activity, and sentiments expressed during at least one of the entertainment event or the entertainment activity; and generate the one or more activities with varying sentiments in different durations, based on the grades of the user.

11. The artificially intelligent perceptive entertainment companion system as claimed in claim 9, wherein the processor is configured to:

acquire information about at least one of the entertainment event or the entertainment activity from the user;

determine perception of the user about the at least one entertainment event or the entertainment activity;

interact with the user and acquire information on user preferences; and enable one or more robot actuators for communicating to the user through the one or more expressions, wherein the one or more robot actuators enables the artificially intelligent perceptive entertainment companion system to perform any of a sound output, a movement or an illumination.

* * * * *